US008718422B2

(12) United States Patent
Rosenberg et al.

(10) Patent No.: US 8,718,422 B2
(45) Date of Patent: May 6, 2014

(54) ANGLED COUPLING FOR OPTICAL FIBERS

(75) Inventors: Paul Kessler Rosenberg, Sunnyvale, CA (US); Michael Renne Ty Tan, Menlo Park, CA (US); Eric Peterson, McKinney, TX (US); Huei Pei Kuo, Cupertino, CA (US); Sagi Varghese Mathai, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 13/258,420

(22) PCT Filed: Apr. 28, 2009

(86) PCT No.: PCT/US2009/041993
§ 371 (c)(1),
(2), (4) Date: Sep. 21, 2011

(87) PCT Pub. No.: WO2010/126492
PCT Pub. Date: Nov. 4, 2010

(65) Prior Publication Data
US 2012/0033914 A1 Feb. 9, 2012

(51) Int. Cl.
*G02B 6/36* (2006.01)
*G02B 6/26* (2006.01)

(52) U.S. Cl.
USPC .................................. 385/32; 385/14; 385/47

(58) Field of Classification Search
None
See application file for complete search history.

(56) References Cited

U.S. PATENT DOCUMENTS

| 5,074,860 A | 12/1991 | Gregory et al. |
| 6,422,761 B1 * | 7/2002 | Naghski et al. .................. 385/73 |
| 7,197,224 B2 | 3/2007 | Rolston et al. |
| 2006/0104592 A1 | 5/2006 | Jenkins et al. |
| 2006/0215954 A1 | 9/2006 | Jenkins et al. |
| 2007/0165980 A1 * | 7/2007 | Jenkins et al. .................. 385/14 |
| 2011/0274391 A1 * | 11/2011 | Tan et al. ........................ 385/27 |

FOREIGN PATENT DOCUMENTS

| CN | 1643413 | 7/2005 |
| CN | 1764856 | 4/2006 |
| EP | 1736805 | 12/2006 |
| GB | 2404450 A | 2/2005 |
| GB | 2443481 | 7/2008 |
| WO | WO-2004083923 A1 | 9/2004 |
| WO | WO-2008122607 | 10/2008 |

* cited by examiner

Primary Examiner — Michelle R Connelly

(57) ABSTRACT

An angled coupling for optical fibers can comprise a body (10) having an incoming aperture (18a) and an outgoing aperture (18b), from which an incoming hollow waveguide (12a) and an outgoing hollow waveguide (12b) extend into the body at an angle (22). A reflective surface (24) is situated at the vertex of the angle and is oriented substantially perpendicular to a bisector of the angle. The coupling also comprises an incoming coupling structure (32a) and an outgoing coupling structure (32b), each configured to attach an optical fiber to the corresponding aperture.

15 Claims, 5 Drawing Sheets

ANGLED COUPLING FOR OPTICAL FIBERS

BACKGROUND

Optical fibers and fiber ribbons are often used to transfer data at high speeds in computing and communication systems. Such a role often involves routing optical fibers through restricted spaces and convoluted pathways (e.g. in a chassis). Complex routing may present difficulties because optical fibers tend to not tolerate bending well. Optical fibers usually exhibit a minimum bend radius, and imposing a bend under that radius can result in degraded performance, such as data signal attenuation. Furthermore, excessive bending can strain the material of the fiber and introduce flaws. Multimode optical fibers can be particularly susceptible to the effects of bending, which can cause mode stripping (i.e. loss of higher order modes in the fiber). The uses of optical fibers may be further broadened by approaches that facilitate the use of optical fibers to transmit data through sharply angled pathways.

DETAILED DESCRIPTION OF EXAMPLE EMBODIMENTS

Figure 1:
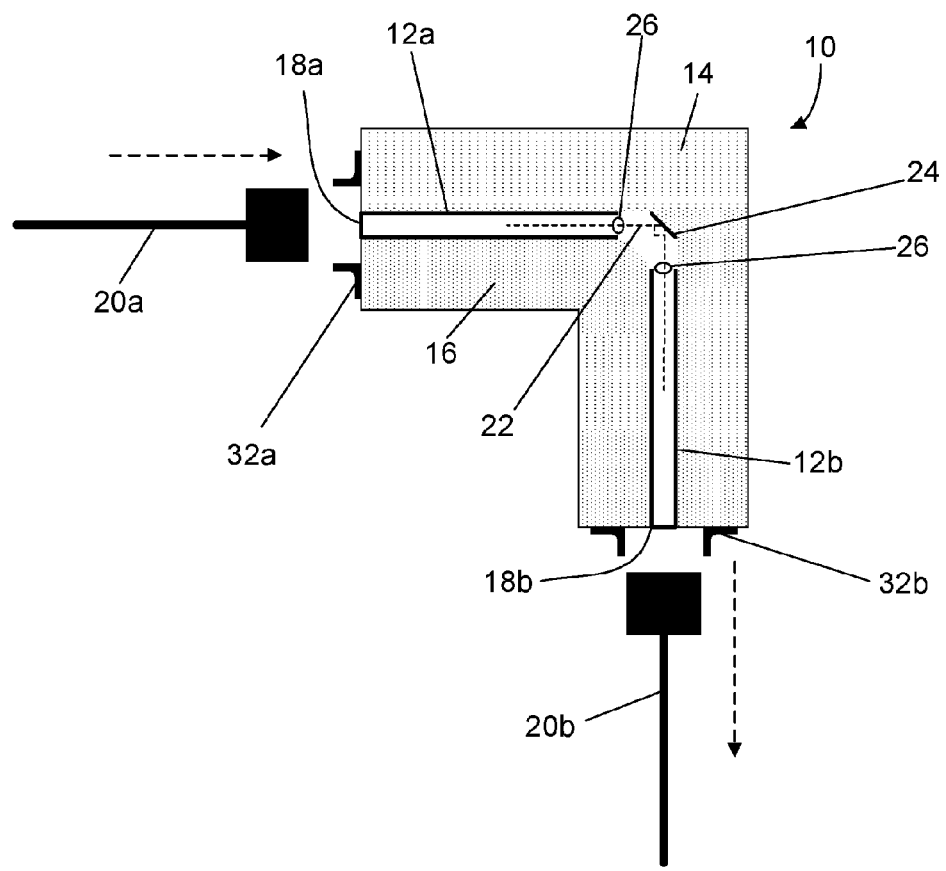
FIG. 1 is a view in cross-section of an angled coupling in accordance with an embodiment.

Features and advantages of the invention will be apparent from the detailed description which follows, taken in conjunction with the accompanying drawings, which together illustrate, by way of example, features of the invention. For the sake of brevity, reference numerals having a previously described function may or may not be described in connection with subsequent drawings in which they appear.

An angled coupling can be used to connect optical fibers so as to change the direction of an optical signal carried by the fibers. Any of the types of optical fibers known in the art may be connected in accordance with the embodiments disclosed herein. These include both single-mode and multi-mode fibers. In particular, the angled connection may include multi-mode fibers.

Wiring in tight or complex spaces can present particular challenges with optical fibers in that such wiring can call for bending the fibers. This may be a particular concern with multi-mode fibers, in that bending multi-mode fibers can result in loss of higher order modes in the fiber.

An angled coupling connection may be used to link single fibers or can also be utilized with multi-fiber cables such as ribbon cables. Handling and connection of optical fibers to other components may be facilitated by housing the ends of the optical fibers in a structure such as a ferrule. Such structures may include features that secure the fiber(s) in position, such as spring-based fasteners, screw fasteners, or friction-based mated couplings.

Most optical fibers have a minimum bend radius, where "bend radius" is generally defined as the radius of a drum or mandrel on which the fiber is to be wound or bent. The minimum bend radius can depend on the material from which the fiber itself is made, and the external jacketing in which it is enclosed. Pulling an optical fiber through a turn having a radius smaller than the minimum bend radius can result in leakage of signal, signal attenuation, or even introduce physical strain damage into the fiber material. As mentioned above, multi-mode fibers can exhibit particular performance losses when bent with too small a radius.

However, the present embodiments allow data transmitted over optical fibers to be directed through abrupt turns and sharp angles without being constrained by the minimum bend radius of the particular fiber used. For example, multi-mode fibers may be used for communication between components in a computer chassis and may be routed through turns having a radius below the minimum bend radius of the fiber. The present embodiments also allow the connection of fibers arranged orthogonally to each other so that they are optically aligned along their common optical axis.

In modular platforms such as blade server systems, there is often a need to provide performance and connectivity within a form factor having limited space. For example, it may be desirable to provide connections between blades in separate bays, and it may be further desirable to do this without relying on backplane connections. Such connectivity may be facilitated using optical fibers. However, space constraints in the chassis can call for tight bends in the fibers. The couplings of the present embodiments can prove useful in such applications, even where small bend radius fibers are available. For example, angled couplings can direct fiber connections where needed, such as around the edges of blades, between bays, and through partitions. At the same time, such couplings can enhance modularity by providing "breakable" connections between modules that can be more compact and stable than bundles of fibers.

Couplings in accordance with one embodiment are shown in FIGS. 1 through 4. As illustrated in the cross-section in FIG. 1, a coupling for changing the direction of a signal in an optical fiber path can comprise a body 10 that houses structures configured to define an angled pathway for an optical signal passing through the coupling. The body can have a substantially solid structure that is penetrated by optical pathways 12, which may themselves be substantially hollow. In a particular embodiment, the body may have an external profile that is angular and which may follow the angle of the pathway. In another embodiment, the body may have an external profile that is configured to fit into a space having a particular shape, such as a corner (e.g. a corner within a chassis). For example, in an angled coupling that provides a 90° turn as shown in FIG. 1, the part 14 of the body external to the angle may also form a right angle. However, the opposing part 16 of the body may reflect the same angle as shown in FIG. 1, or alternatively, may fill in the angle so as to provide a particular profile to the sides of the body interior to the angle, such as in the embodiment shown in FIG. 2.

Each pathway 12 can open to the exterior of the body 10 via an aperture 18 situated on an exterior surface. The pathway may extend into the body from this aperture. Specifically, one such pathway, extending from an incoming aperture 18a, can constitute an incoming pathway 12a to which a fiber 20a for carrying an incoming optical signal can be connected. Another such pathway in the coupling, extending from an outgoing aperture 18b, can constitute an outgoing pathway 12b to which a fiber 20b carrying the same optical signal out of the coupling may be connected. The outgoing pathway can be oriented in a different direction from the incoming pathway. That is, the incoming and outgoing pathways may be situated at an angle 22 to each other, where the angle is the degree of turn that the coupling provides to the optical signal. For purposes of illustration, the direction of travel for the optical signal is indicated in FIG. 1 by dashed arrows. It should be understood, however, that couplings according to the present embodiments can carry optical signals in either direction, i.e. either aperture and pathway may be "incoming" or "outgoing".

Couplings according to the present embodiments may be made to provide a wide range of turn angles, including acute angles, obtuse angles, and a right angle. In a particular aspect, the angle may be from about 50 degrees to about 130 degrees. In a more particular aspect, the angle may be from about 80 degrees to about 100 degrees. In one particular embodiment, the coupling provides a 90-degree turn. Other angles may be provided by combining couplings in series. For example, a 180-degree turn may be achieved by connecting two 90-degree couplings. Similarly, two couplings may be connected to achieve a change in direction in more than one axis. For example, two 90-degree couplings may be connected, where the second coupling is rotated so as to direct a signal in a plane perpendicular to that occupied by the first coupling.

The optical pathways 12a-b of the coupling can comprise one or more hollow waveguides, or more particularly hollow metal waveguides. In a particular embodiment, the waveguide may be coated to aid in transmission and internal reflection of the optical signal. In a more particular embodiment, the coating may be a reflective metallic coating. The optical pathways may comprise hollow cylindrical waveguides or hollow waveguides having a substantially rectangular cross-section. The diameter of the pathways may be chosen so as to adequately transmit optical signals over the desired distance with minimal loss due to bouncing or scattering. In a particular embodiment, the pathways have an inner diameter from about 100 µm to about 200 µm.

In the arrangement described above, the incoming and outgoing waveguides are oriented so that their axes of orientation intersect at a prescribed angle. Within the body 10, the waveguides may extend toward the vertex of the angle without actually meeting at the vertex themselves. According to the general embodiment, a reflective surface 24 may be situated at the vertex, where the reflective surface accomplishes the change in direction of the optical signal by receiving the incoming signal from the incoming pathway and reflecting it down the outgoing pathway. The reflective surface may therefore be oriented at an angle that will accomplish this. More particularly, the reflective surface may be oriented normal to the bisector of the angle so as to provide the proper angle of incidence of the optical signal for a number of values of turn angle. For example, in a coupling for turning a signal 90° as illustrated in FIG. 1, the angle of incidence of the incoming signal onto the reflective surface may be around 45°.

In a particular embodiment, the reflective surface can be provided by application of a highly reflective coating to a surface situated in the body as described above. In a more particular embodiment, the reflective coating can be a metallic coating. The metal used may be any metal known to be highly reflective and which is amenable to application by conventional techniques. Examples of suitable coating materials include gold, silver, and aluminum. In another embodiment, the reflective surface may be provided by an insert of reflective material secured in the appropriate place in the body as defined above.

The reflective surface 24 may have a shape that facilitates reflection of the optical signal into the outgoing waveguide. In a particular embodiment, the reflective surface is substantially flat. In another embodiment, the reflective surface may exhibit a degree of concavity so as to focus the signal further.

In an aspect of the embodiment described above, the optical signal travels from the fiber, into the aperture, down the optical pathway, and then out that pathway to travel to the reflective surface. In a particular aspect, the distance traveled between the optical pathway and the reflective surface is short so as to reduce signal loss due to divergence or other issues that may arise from free space transmission of the signal. In a more specific aspect, this distance is less than about 250 µm.

It may be desirable to insure efficient throughput of the signal by reducing insertion loss as the signal is transmitted between components, i.e. from fiber to aperture or from waveguide to reflective surface. According to a particular embodiment, a collimating lens 26 may be included in the incoming light path as shown in FIG. 1. The lens may be situated at any point of the light path where it will be effective in addressing divergence and scattering. In a particular embodiment, a collimating lens may be located at the end of the incoming optic fiber. In an alternative embodiment, the lens may be located in the aperture. Alternatively, a collimating lens may be situated within the coupling, e.g. within the optical pathway or at its interior end. The addition of a collimating lens can increase the distance over which the signal may travel while maintaining integrity. As such, in embodiments that include a collimator, the distance between the optical pathway and the reflective surface may be somewhat greater than in couplings that lack such a feature.

In another embodiment, a lens may be situated in the outgoing pathway so as to focus the signal into the outgoing optical fiber. In a more particular embodiment, a lens is located at the receiving end of the outgoing optical fiber. In a still more particular embodiment the lens is a collimating lens. In another particular embodiment, the lens further focuses the signal to insure efficient transfer into the outgoing fiber.

Many of the components in the embodiments described herein are amenable to multiplication so as to provide an angled coupling for multiple optical fibers within a compact area. For example, optical fibers are commonly bound with others to make a fiber optic ribbon cable. Therefore, in one aspect of the embodiments herein, a plurality of incoming and outgoing apertures and pathways may be arranged to correspond with the number of fibers in a ribbon cable. An example of this is illustrated in the perspective views of FIG. 2, where a row of apertures 28 serves a plurality of waveguides arranged in parallel and spaced for alignment with a row of optical fiber ends in a ribbon cable.

Effective transmission of the signal through a coupling in accordance with these embodiments may also be facilitated by proper alignment of the components. Accordingly, particular embodiments may include alignment features that provide a particular alignment of parts of the light path. In a particular embodiment, the fiber end(s) are housed in a ferrule 30 that is configured to fit in a corresponding coupling structure 32 on the body of the coupling. The coupling structure can be a socket, frame, or other structural accommodation configured to attach an optical fiber to an aperture. For example, as shown in FIG. 1, an incoming coupling structure 32a can serve to attach an incoming optical fiber 20a to the incoming aperture 18a. Likewise, an outgoing optical fiber 20b can be attached to the outgoing aperture 18b by an outgoing coupling structure 32a. The ferrule may have a size and shape relative to the coupling structure so that a pressure fit is established that provides stability and alignment of the fiber and the light path. In another embodiment, stability and alignment can be provided by a magnetic coupling, where magnetic elements in the ferrule mate with corresponding magnetic elements in or near the aperture(s).

Figure 2:
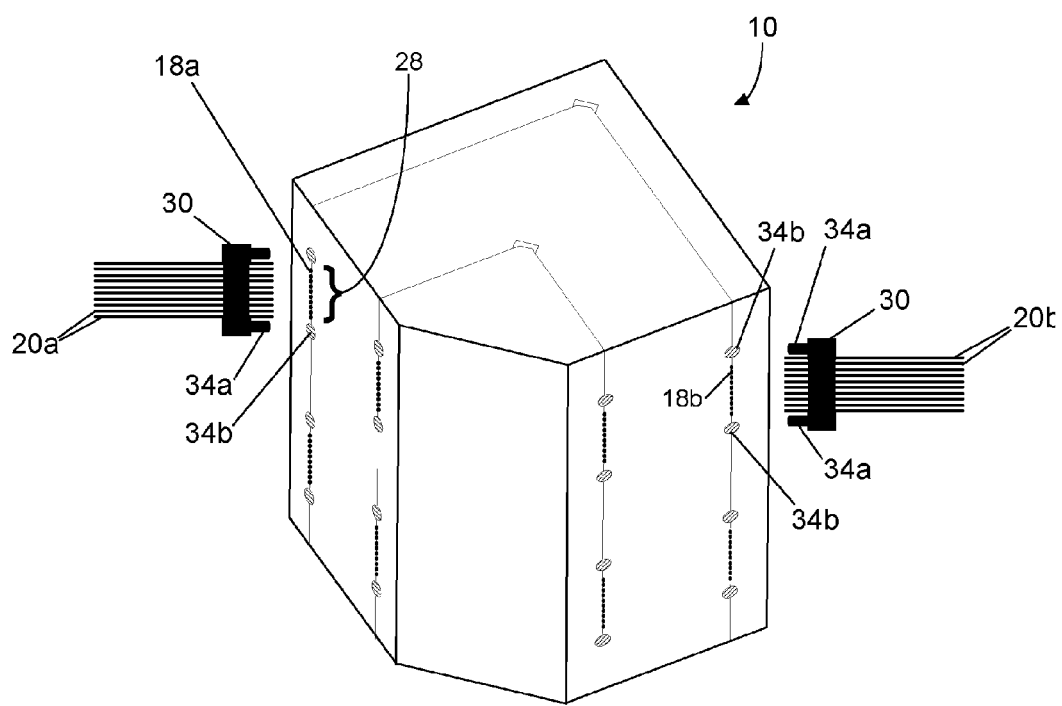
FIG. 2 is a perspective view of an angled coupling in accordance with another embodiment.

In more particular embodiment, alignment features 34 are associated with the connection of a fiber with an aperture of the coupling. As illustrated in FIG. 2, these may include a datum feature such as a pin 34a or other protuberance on one component that is configured to fit into a corresponding hole 34b or depression on the other component. Such features may be employed on the connection of the body to either the incoming fiber, outgoing fiber, or both.

The effectiveness of such alignment features may be affected if changes in the temperature of the environment cause differential contraction or expansion of the components. For example, if the material of the body and its alignment feature has a different thermal expansion coefficient from that of a ferrule or its corresponding alignment feature, then a temperature change may cause the connection to loosen and the fiber-to-aperture alignment to degrade. Accordingly, in a particular embodiment, the body is made of a material having a low coefficient of thermal expansion. In another embodiment, the body material has a coefficient of thermal expansion that is similar to that of the ferrule or other structure housing the fiber ends. In a more particular embodiment, materials are chosen for these components that have substantially the same thermal expansion coefficient.

Figure 3:
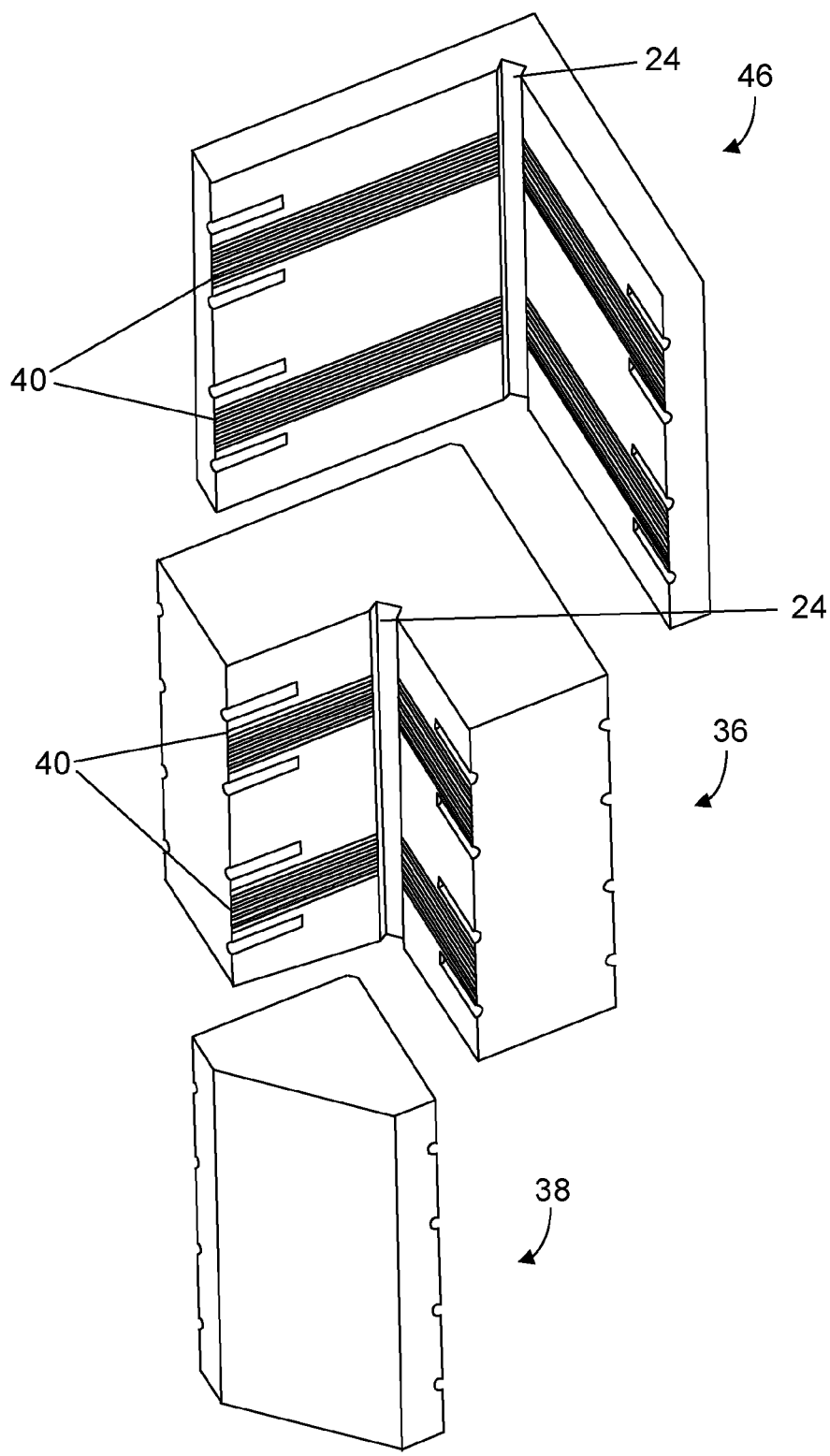
FIG. 3 is a perspective view of three body sections that can be assembled to make the angled coupling of FIG. 2.

The embodiments of the coupling described herein can comprise a plurality of sections that may be assembled to form the body. An exemplary embodiment is shown in FIG. 3. Each angled coupling body may comprise a first section 36 and a second section 38, the interface between which is coincident with a line dividing the optical pathway along its axis. The first section includes the part of the body outside the turn and the second section includes the part of the body on the inside of the turn. Each section can include one or more channels 40 molded into its interface surface and matched with corresponding channels 40 on the other section. When the sections are joined, the channels join to form the cylindrical waveguides that constitute the optical pathway 12 as described above. The channels may be shaped so as to create a pathway having a certain cross-sectional profile, e.g. two sections having hemi-cylindrical channels can be joined to provide a body with cylindrical waveguides. The reflective surface 24 for guiding the optical signal toward the outgoing waveguide may be included in the first section at the vertex of the angle 22 along which the waveguides are oriented. In embodiments comprising multiple pathways to accommodate ribbon cables, each section may include a plurality of parallel channels so that a row of parallel waveguides is formed when the sections are joined.

The reflective surface 24 can be made to serve as many fibers in a row as a width of the body will accommodate, in that a single reflective surface may extend from one edge of the body to the other. By this same principle, a row of fibers according to these embodiments may comprise a plurality of individual fibers or even a plurality of ribbon cables as illustrated in FIG. 3.

Figure 4:
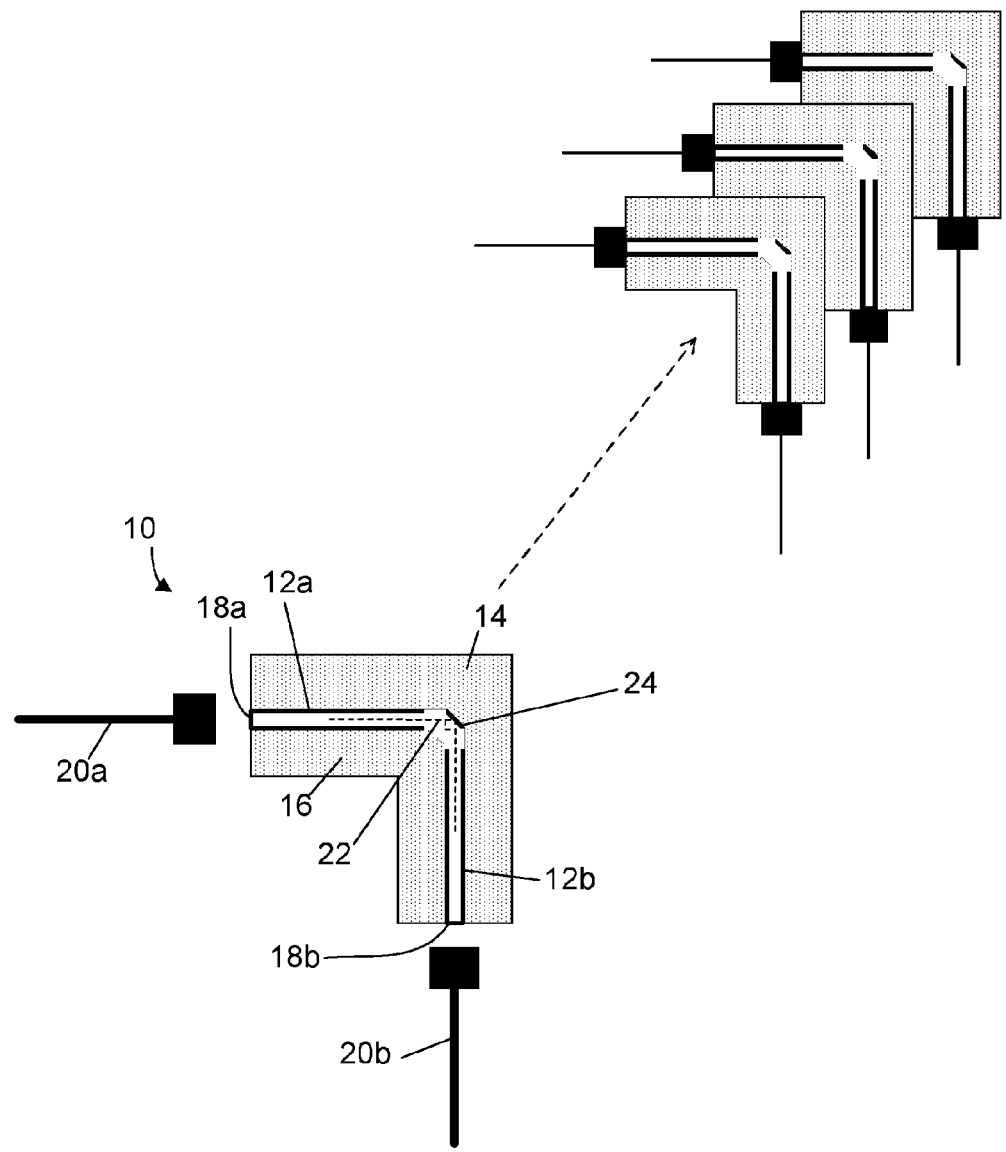
FIG. 4 is a view in cross-section of a plurality of angled couplings joined in accordance with an embodiment.
Figure 5:
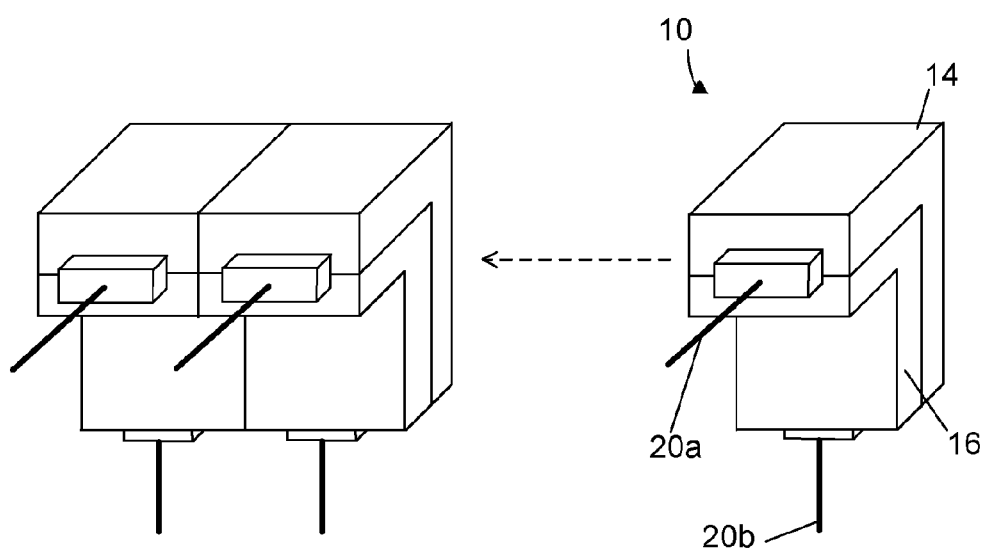
FIG. 5 is a perspective view of a plurality of angled couplings joined in accordance with another embodiment.

The body of the coupling may also be formed so as accommodate stacking of multiple coupling units. That is, the body may be made with enough depth to include more than one row 28 of apertures so that more than one cable of optical fibers 20 may be connected to it, as shown in FIG. 2. An alternate embodiment providing a similar benefit is shown in FIG. 4, where a plurality of single-row angled couplings having the same angle profile may be nested to provide stacked pathways. In FIG. 4, the attachment for an additional coupling is indicated by the dashed arrow. According to another alternate embodiment, shown in FIG. 5, couplings may be stacked side by side. In either of these two embodiments, the angled couplings can be configured to removably attach to each other, so as to accommodate a needed number of fibers within a particular space. The number of couplings that may be stacked can depend on the available space, as well as on the degree of angle of the couplings. For example, for the embodiment shown in FIG. 4, nested couplings having more obtuse angles may occupy less space than nested couplings having acute angles.

Beside the benefit of eliminating the need for bending the fibers or cables in a turn, these nesting or stacking approaches also impose a level of organization on a group of fibers. This can reduce clutter within the chassis and facilitate more efficient use of space. It can also make servicing the device easier by making it easier to track a particular connection through the chassis when diagnosing a problem. Accordingly, in one aspect of this embodiment, the coupling body may include labels for each of the individual connections, where a matching label is used on both a particular incoming connection and the corresponding outgoing connection.

In particular embodiments comprising sections, stacking may be accomplished by molding channels into both sides of a section so that the section can serve both as the inner section for one turning element and the outer section for another turning element. A plurality of such sections may then be stacked to provide the number of connections needed. Such an arrangement is shown in FIG. 3, where the first section 36 includes channels on the interface 42 with the second section 38 and additional channels on its opposite side 44 to correspond with channels on a third section 46.

As described above, the stack of connections may have an angled section as its most interior section (first section 36), or the interior section may be a solid piece shaped so as to give the coupling a different profile, e.g. a piece having a cross-section that is substantially triangular, square, or rectangular.

Summarizing and reiterating to some extent, an angled coupling has been described which allows a fiber optic pathway to negotiate a turn without appreciably bending the fiber. The coupling can include hollow metal waveguides and a reflective surface for directing an optical signal.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An angled coupling for optical fibers, comprising:
   a body including an incoming aperture and an outgoing aperture;
   an incoming hollow metal waveguide extending into the body from the incoming aperture and in direct contact with the body;
   an outgoing hollow metal waveguide in direct contact with the body, separate from and not in contact with the incoming hollow metal waveguide, and extending into the body from the outgoing aperture, wherein the incoming hollow metal waveguide and the outgoing hollow metal waveguide are oriented at an angle to each other, the angle having a vertex;
   a reflective surface separate from and not in contact with the incoming hollow metal waveguide and the outgoing hollow metal waveguide and situated at the vertex of the angle and having an orientation substantially perpendicular to a bisector of the angle;
   an incoming coupling structure configured to attach an optical fiber to the incoming aperture; and an outgoing coupling structure configured to attach an optical fiber to the outgoing aperture.

2. The angled coupling of claim 1, wherein the body comprises a first section and a second section, each having a joint face that include channels situated so as to form the incoming hollow waveguide and the outgoing hollow waveguide when the first section and second section are joined.

3. The angled coupling of claim 1, wherein the angle has a value from about 50 degrees to about 130 degrees.

4. The angled coupling of claim 1, further comprising a collimating lens aligned with the incoming hollow metal waveguide.

5. The angled coupling of claim 1, further comprising a collimating lens aligned with the outgoing hollow metal waveguide.

6. The angled coupling of claim 1, wherein each hollow metal waveguide terminates a distance of from about 10 μm to about 200 μm from a vertex of the angle.

7. The angled coupling of claim 1, wherein the incoming hollow metal waveguide has a diameter of from about 100 μm to about 200 μm.

8. The angled coupling of claim 1, wherein the reflective surface has a metallic coating.

9. The angled coupling of claim 1, further comprising an incoming optical fiber attached to the incoming aperture and an outgoing optical fiber aligned with the outgoing aperture.

10. The angled coupling of claim 9, wherein the incoming optical fiber and the outgoing optical fiber are multimodal.

11. A method for connecting optical fibers via an angled coupling as in claim 1, comprising:

attaching the incoming optical fiber to the incoming aperture, so that the incoming optical fiber is aligned with the incoming hollow metal waveguide of the angled coupling; and attaching the outgoing optical fiber to the outgoing aperture, so that the outgoing optical fiber is aligned with the outgoing hollow metal waveguide of the angled coupling.

12. The method of claim 11, wherein the angle has a value from about 50 degrees to about 130 degrees.

13. The method of claim 11, wherein the angled coupling comprises two angled couplings connected in series.

14. The method of claim 11, wherein the incoming optical fiber and the outgoing optical fiber are multimodal.

15. The method of claim 11, further comprising connecting a plurality of incoming multimodal fibers to a plurality of outcoming multimodal fibers through a plurality of angled couplings attached to each other.

* * * * *

UNITED STATES PATENT AND TRADEMARK OFFICE
CERTIFICATE OF CORRECTION

Page 1 of 1

PATENT NO. : 8,718,422 B2
APPLICATION NO. : 13/258420
DATED : May 6, 2014
INVENTOR(S) : Paul Kessler Rosenberg et al.

It is certified that error appears in the above-identified patent and that said Letters Patent is hereby corrected as shown below:

In the Claims:

In column 8, line 14, in Claim 12, delete "claim 11 ," and insert -- claim 11, --, therefor.

In column 8, line 16, in Claim 13, delete "claim 11 ," and insert -- claim 11, --, therefor.

Signed and Sealed this
Fourteenth Day of October, 2014

Michelle K. Lee
*Deputy Director of the United States Patent and Trademark Office*